US011409798B2

(12) United States Patent
Jung et al.

(10) Patent No.: US 11,409,798 B2
(45) Date of Patent: Aug. 9, 2022

(54) GRAPH PROCESSING SYSTEM INCLUDING DIFFERENT KINDS OF MEMORY DEVICES, AND OPERATION METHOD THEREOF

(71) Applicants: SK hynix Inc., Gyeonggi-do (KR); Industry-Academic Cooperation Foundation, Yonsei University, Seoul (KR)

(72) Inventors: Myoungsoo Jung, Daejeon (KR); Mi-Ryeong Kwon, Daejeon (KR)

(73) Assignees: SK hynix Inc., Gyeonggi-do (KR); Industry-Academic Cooperation Foundation, Yonsei University, Seoul (KR)

( * ) Notice: Subject to any disclaimer, the term of this patent is extended or adjusted under 35 U.S.C. 154(b) by 272 days.

(21) Appl. No.: 16/870,553

(22) Filed: May 8, 2020

(65) Prior Publication Data
US 2021/0064661 A1 Mar. 4, 2021

(30) Foreign Application Priority Data
Aug. 26, 2019 (KR) .................. 10-2019-0104278

(51) Int. Cl.
*G06F 16/901* (2019.01)
*G06F 12/02* (2006.01)
(52) U.S. Cl.
CPC ...... *G06F 16/9024* (2019.01); *G06F 12/0238* (2013.01)
(58) Field of Classification Search
None
See application file for complete search history.

(56) References Cited

U.S. PATENT DOCUMENTS

| | | | |
|---|---|---|---|
| 2017/0068606 A1* | 3/2017 | Vora | G06F 11/323 |
| 2017/0323463 A1* | 11/2017 | Leiba | G06F 3/0485 |
| 2018/0089002 A1* | 3/2018 | Xia | G06F 1/324 |
| 2020/0183604 A1* | 6/2020 | Elyasi | G06F 3/0644 |

(Continued)

OTHER PUBLICATIONS

Ian Rogers, The Google Pagerank Algorithm and How It Works, 2002, http://www.sirgroane.net/google-page-rank/.

(Continued)

*Primary Examiner* — Uyen T Le
(74) *Attorney, Agent, or Firm* — IP & T Group LLP (57) ABSTRACT

A method for operating a graph processing system including a first and second memory, comprising: storing in the first memory, a start index, a terminal index and an edge value of graph data; storing in the second memory, a start vertex of the graph data; rearranging the start vertex as an intermediate vertex by using to the start index; performing a graph computation on the intermediate vertex by using to the terminal index and the edge value; storing in the second memory, a terminal vertex as a result of the graph computation; determining whether a graph processing operation is completed by comparing the terminal vertex and the start vertex; setting the terminal vertex as the start vertex when the graph processing operation is not completed; and iterating the rearranging, the performing, the storing the terminal vertex, the determining and the setting until the graph processing operation is completed.

20 Claims, 5 Drawing Sheets

(56) References Cited

U.S. PATENT DOCUMENTS

2020/0293372 A1* 9/2020 Haprian .............. G06F 11/3006
2020/0319974 A1* 10/2020 Lacey ....................... G06F 1/30

OTHER PUBLICATIONS

Page et al., The PageRank Citation Ranking: Bringing Order to the Web, Technical Report, Jan. 29, 1998, pp. 1-17, Stanford University, http://ilpubs.stanford.edu:8090/422/1/1999-66.pdf.

Ediger et al., Massive Social Network Analysis: Mining Twitter for Social Good, Conference Paper, Sep. 2010, pp. 583-593, DOI: 10.1109/ICPP.2010.66, 39th International Conference on Parallel Processing, USA.

Shen et al., Fast Failure Recovery in Distributed Graph Processing Systems, Research-Article, Dec. 2014, pp. 437-448, vol. 8 No. 4, Proceedings of the VLDB Endowment.

Malewicz et al., Pregel: A System for Large-Scale Graph Processing, Conference Paper, 2010, pp. 135-145, DOI: 10.1145/1582716.1582723, 21st ACM Symposium on Parallelism in Algorithms and Architectures, Canada.

Williams et al., Optimization of Sparse Matrix-Vector Multiplication on Emerging Multicore Platforms, Conference Paper, 2007,pp. 1-12, Article No. 38, SC '07: Proceedings of the 2007 ACM/IEEE Conference on Supercomputing, USA.

Kyrola et al., GraphChi: Large-Scale Graph Computation on Just a PC, Conference Paper, 2012, pp. 31-46, 10th USENIX Symposium on Operating Systems Design and Implementation (OSDI '12), USA.

Leskovec et al., Internet Mathematics, Community Structure in Large Networks: Natural Cluster Sizes and the Absence of Large Well-Defined Clusters, Journal, Jan. 30, 2011,pp. 29-123, vol. 6, Issue No. 1, Taylor and Francis Group.

* cited by examiner

|    | S_INDEX | S_VALUE | ST_EDGE | T_INDEX |
|----|---------|---------|---------|---------|
| R1 | 0       | $V_0$   | 5       | 1       |
| R2 | 1       | $V_1$   | 1       | 2       |
| R3 | 5       | $V_5$   | 6       | 1       |
| R4 | 5       | $V_5$   | 4       | 3       |
| R5 | 6       | $V_6$   | 4       | 0       |
| R6 | 7       | $V_7$   | 3       | 0       |
| R7 | 7       | $V_7$   | 9       | 2       |

FIG. 4

(1) : VERTEX COMPUTATION
(2) : MESSAGE PASSING

FIG. 5

GRAPH PROCESSING SYSTEM INCLUDING DIFFERENT KINDS OF MEMORY DEVICES, AND OPERATION METHOD THEREOF

CROSS-REFERENCE TO RELATED APPLICATION

This application claims priority under 35 U.S.C. § 119 to Korean Patent Application No. 10-2019-0104278, filed on Aug. 26, 2019, which is incorporated herein by reference in its entirety.

BACKGROUND

1. Field

Various embodiments of the invention relate to a graph processing system, and particularly, to a graph processing system including different kinds of memory devices and a method for operating the graph processing system.

2. Discussion of the Related Art

With the advent of the big data era, a graph-based data structure for efficiently expressing and analyzing the relationships between data plays an important role in machine learning and various data analyses. Accordingly, various graph algorithms are actually being used as main applications in corporate data centers.

For example, Google's PageRank (Reference 1: Ian Rogers, "The Google PageRank Algorithm and How It Works", 2002) and Twitter's connected component algorithm (Reference 2: David Ediger, Karl Jiang, Jason Riedy, David A. Bader, and Courtney Corley, "Massive Social Network Analysis: Mining Twitter for Social Good" in ICPP, 2010) discuss representative graph-based data analysis applications.

Figure 1:
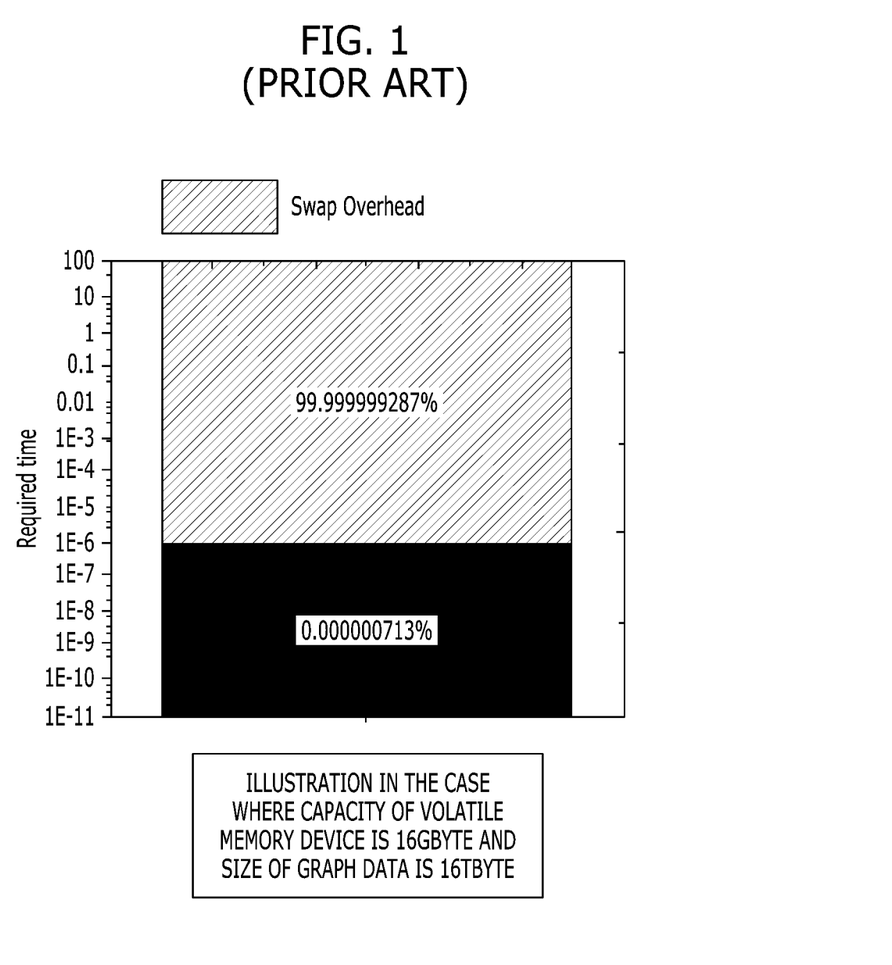
FIG. 1 is a diagram illustrating an example of a data swap overhead percentage in the graph computation of a conventional graph processing system.

Systems which apply a general purpose graphics processing unit (GPGPU) are used in many computation domains to satisfy high numbers of computations demanded by graph applications. However, because it is the norm that only a volatile memory device having relatively small capacity is included in a GPGPU system, frequent page swapping with respect to the volatile memory device and frequent data copying between a host and a device occur as illustrated in FIG. 1, which may cause degradation in the performance of the applications. FIG. 1 shows a case in which the volatile memory device has 16 GB capacity and the size of the graph data is 16 TB.

Furthermore, since a main ending condition of a graph algorithm is saturation, after a number of iterative computations are performed, a checkpoint operation of storing a computation result in a separate storage device connected with the GPGPU system is required for efficient failure recovery. However, since it is the norm that the separate storage device connected with the GPGPU system uses a disk/flash-based storage device, a problem may be encountered in that, in the GPGPU system, a time required for the checkpoint operation of storing a computation result in the storage device is longer than a time required to perform computations.

For example, in the case of the Google's PageRank algorithm described above, the computation time required is 30 seconds, but the checkpoint time required is 60 seconds (Reference 3: Yanyan Shen, Gang Chen, H. V. Jagadish, Wei Lu, Beng Chin Ooi, and Bogdan Marious Tudor, "Fast Failure Recovery in Distributed Graph Processing Systems" in VLDB, 2014).

SUMMARY

Various embodiments are directed to a graph processing system including two kinds of memory devices having different characteristics and thereby effectively checkpointing a graph computation result while quickly performing iterative graph computations on graph data, and a method for operating the graph processing system.

In accordance with an embodiment of the present invention, a method for operating a graph processing system including a first memory device and a second memory device, the method may include: storing, as a first storage operation, in the first memory device, a start vertex index, a terminal vertex index and an edge value between a start vertex and a terminal vertex, of graph data inputted from a host; storing, as a second storage operation, in the second memory device, a start vertex value of the graph data; rearranging the start vertex value as an intermediate vertex value by using to the start vertex index; performing a graph computation on the intermediate vertex value by using to the terminal vertex index and the edge value; storing, as a third storage operation, in the second memory device, a terminal vertex value as a result of the graph computation; determining whether a graph processing operation is completed by comparing the terminal vertex value and the start vertex value; setting the terminal vertex value as the start vertex value when the graph processing operation is determined as not completed; and iterating the rearranging, the performing, the third storage operation, the determining and the setting until it is determined that the graph processing operation is completed.

The method further may include: storing, as a fourth storage operation, the terminal vertex value in the first memory device, as the result of the graph processing operation, when it is determined that the graph processing operation is completed.

The method further may include: storing, as an intermediate storage operation, when it is determined that the graph processing operation is not completed, and storing the terminal vertex value in the first memory device as an intermediate result of the graph processing operation, depending on a number of times the determining operation is performed.

A period in which the intermediate storage operation may be performed overlaps with a period in which the setting, the rearranging, the performing, the third storage and the determining operations are performed through the iterating.

When the intermediate storage operation is performed at least twice, a storage area of the first memory device which is used in a preceding intermediate storage operation and a storage area of the first memory device which is used in a following intermediate storage operation may be different from each other, and the storage area which is used in the preceding intermediate storage operation may be released when the following intermediate storage operation is completed.

A storage area of the first memory device which is used in the intermediate storage operation and a storage area of the first memory device which is used in the fourth storage operation may be different from each other, and the storage area which is used in the intermediate storage operation may be released when the fourth storage operation is completed.

The performing of the graph computation may include generating a message, the method may further include:

storing, as a fifth storage operation, in the second memory device, the message to correspond to the terminal vertex value.

The first memory device may be a nonvolatile memory device which inputs/outputs data in the unit of a page, and the second memory device may be a volatile memory device which inputs/outputs data in the unit of a bit.

The graph data may include a plurality of pieces of data that include a plurality of start vertex indexes, a plurality of terminal vertex indexes, a plurality of edge values and a plurality of start vertex values, respectively. The first storage operation may include: grouping the plurality of start vertex indexes, the plurality of terminal vertex indexes, and the plurality of edge values in units of pages; and storing, as sixth storage operation, the pages in the first memory device, and the second storage operation may include storing the start vertex values in the second memory device.

In accordance with an embodiment of the present invention, a graph processing system may include: a first memory device; a second memory device; and a graph processing device configured to: may store, as a first storage operation, in the first memory device, a start vertex index, a terminal vertex index and an edge value between a start vertex and a terminal vertex of graph data inputted from a host; may store, as a second storage operation, in the second memory device, a start vertex value in the graph data; rearrange the start vertex value as an intermediate vertex value based on the start vertex index; may perform a graph computation on the intermediate vertex value based on the terminal vertex index and the edge value; may store, as a third storage operation, in the second memory device, a terminal vertex value as a result of the graph computation; may determine whether a graph processing operation is completed by comparing the terminal vertex value and the start vertex value; may set the terminal vertex value as the start vertex value when it is determined that the graph processing operation is not completed; and may iterate the rearrange, perform, third storage, determine and set operations until it is determined that the graph processing operation is completed.

The graph processing device is further configured to: may store, as an intermediate storage operation, when it is determined that the graph processing operation is not completed, the terminal vertex value in the first memory device as an intermediate result of the graph processing operation, depending on a number of times the determination act is performed; and may store, as a fourth storage operation, the terminal vertex value in the first memory device, as the result of the graph processing operation, when it is determined that the graph processing operation is completed.

The graph processing device may further control a period in which the intermediate storage operation is performed, to overlap with a period in which the set, rearrange, perform, third storage and determine operations are performed through the iterate operation.

The graph processing device is further configured to: may set, when the intermediate storage operation is performed at least twice, a storage area used in the first memory device in a preceding intermediate storage operation and a storage area used in the first memory device in a following intermediate storage operation to be different from each other, and may release the storage area used in the preceding intermediate storage operation when the following intermediate storage operation is completed.

The graph processing device is further configured to: may set a storage area used in the first memory device in the intermediate storage operation and a storage area used in the first memory device in the fourth storage operation to be different from each other, and may release the storage area used in the intermediate storage operation when the fourth storage operation is completed.

The perform the graph computation operation may include generating a message, and the graph processing device is further configured to may store, as a fifth storage operation, in the second memory device, the message to correspond to the terminal vertex value.

The first memory device may be a nonvolatile memory device which inputs/outputs data in the unit of a page, and the second memory device may be a volatile memory device which inputs/outputs data in the unit of a bit.

The graph data may include a plurality of pieces of data that include a plurality of start vertex indexes, a plurality of terminal vertex indexes, a plurality of edge values and a plurality of start vertex values, respectively. The first storage operation may include: grouping the plurality of start vertex indexes, the plurality of terminal vertex indexes, the plurality of edge values in units of pages; and storing, as a sixth storage operation, the pages in the first memory device, and the second storage operation may include storing the start vertex values in the second memory device.

In accordance with an embodiment of the present invention, a graph processing system may include: a first memory device configured to store a read-only portion of graph data inputted from a host; a second memory device configured to store a read-and-write portion of the graph data; and a graph processor configured to: may perform a super step operation iteratively based on the graph data distributed in the first and second memory devices; and may perform, each time after a set number of the iterations are performed, a checkpointing operation of storing a result of a last of the set number of the iterations, the first memory device may have a greater storage capacity than the second memory device, and the second memory device may have a higher operation speed than the first memory device.

The read-only portion may include a start vertex index, a terminal vertex index and an edge value between a start vertex and a terminal vertex in each piece of the graph data, and the read-and-write portion may include a start vertex value of a row.

The first memory device respectively may store, on a group basis, the start vertex indexes, the terminal vertex indexes and the edge values in plural pieces of the graph data, and each of the groups may have a size corresponding to a storage element of the first memory device.

In embodiments of the present invention, by distributedly storing graph data inputted from a host, in two kinds of memory devices having different characteristics, it is possible to quickly perform iterative graph computations on the graph data while effectively storing the graph data.

DETAILED DESCRIPTION

Various examples of the disclosure are described below in more detail with reference to the accompanying drawings. Aspects and features of the present invention, however, may be embodied in different ways to form other embodiments, including variations of any of the disclosed embodiments. Thus, the invention is not limited to the embodiments set forth herein. Rather, the described embodiments are provided so that this disclosure is thorough and complete and fully conveys the disclosure to those skilled in the art to which this invention pertains. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without indicating any change in the element itself.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention. As used herein, singular forms are intended to include the plural forms and vice versa, unless the context clearly indicates otherwise. Similarly, the indefinite articles "a" and "an" mean one or more, unless it is clear from the language or context that only one is intended.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the invention belongs in view of the disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Figure 2:
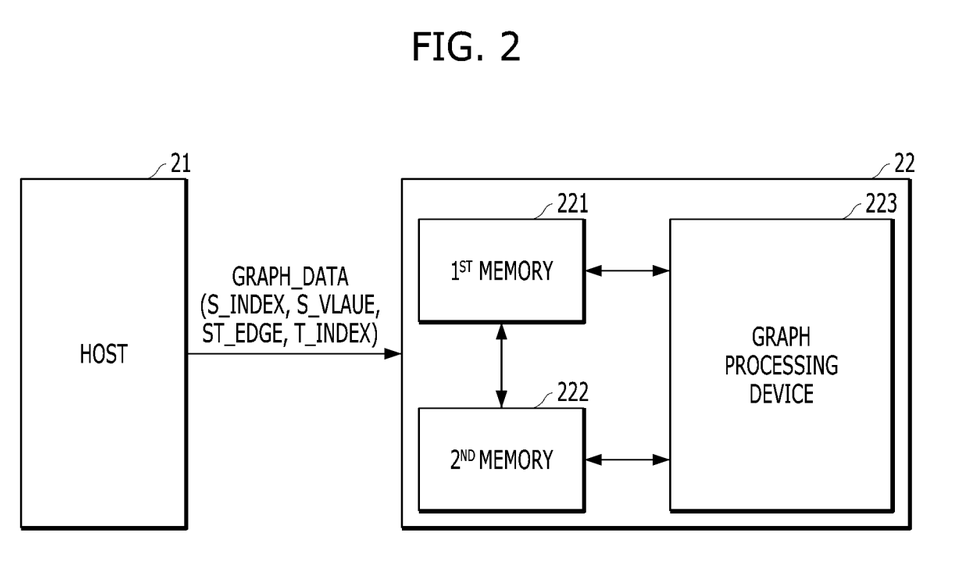
FIG. 2 is a diagram illustrating a graph processing system in accordance with an embodiment of the disclosure.
Figure 3:
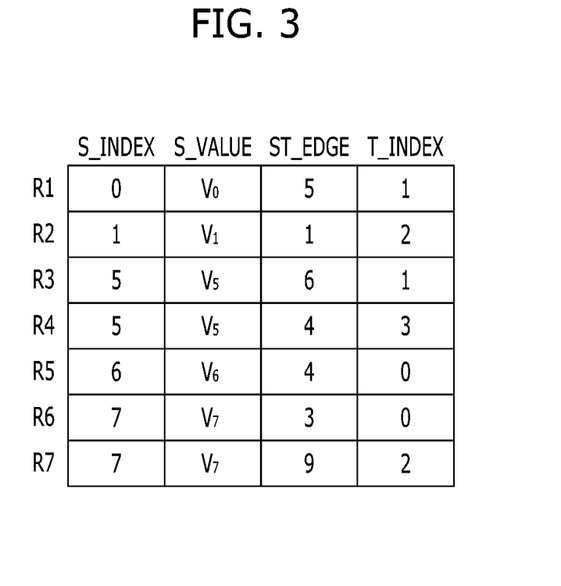
FIG. 3 is an example of a diagram to assist in the explanation of a graph data structure used in G-shard.
Figure 4:
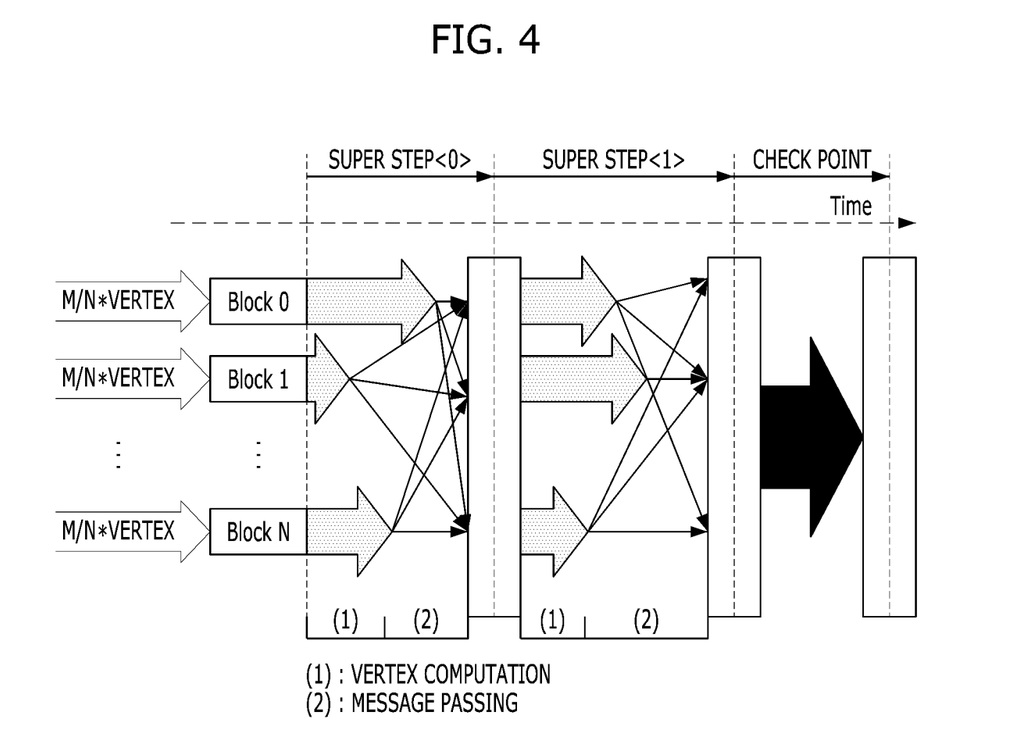
FIG. 4 is an example of a diagram to assist in the explanation of a bulk synchronous parallel (BSP) model-based graph processing platform.
Figure 5:
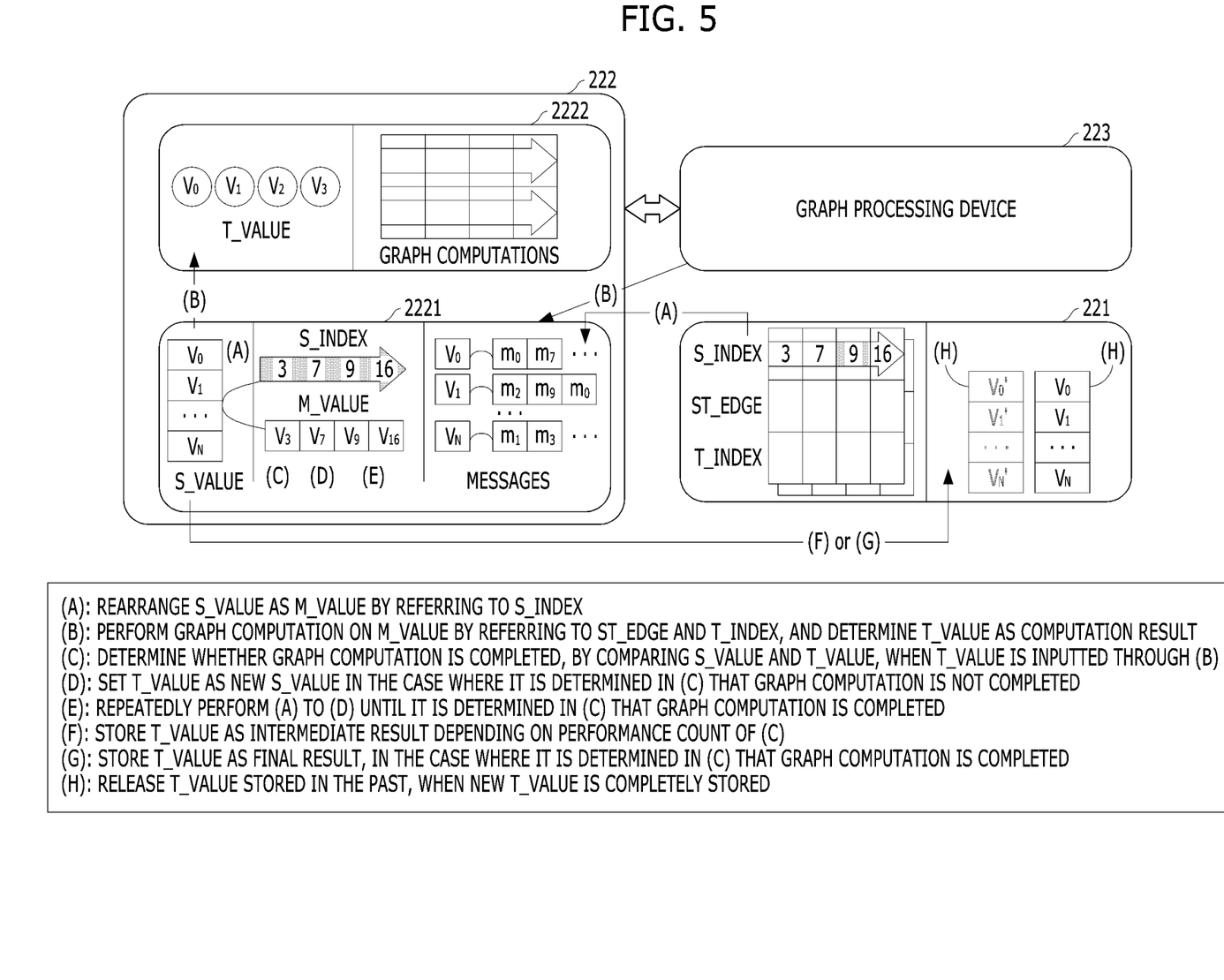
FIG. 5 is a diagram to assist in the explanation of a graph processing operation in accordance with an embodiment of the disclosure.

FIG. 2 is a diagram illustrating a graph processing system in accordance with an embodiment of the disclosure. FIG. 3 is an example of a diagram to assist in the explanation of a graph data structure used in G-shard. FIG. 4 is an example of a diagram to assist in the explanation of a bulk synchronous parallel (BSP) model-based graph processing platform. FIG. 5 is a diagram to assist in the explanation of a graph processing operation in accordance with an embodiment of the disclosure.

Referring to FIG. 2, the graph processing system 22 may include a first memory device 221, a second memory device 222, and a graph processing device 223.

First, a host 21 may transfer graph data GRAPH_DATA to the graph processing system 22, which may distributedly store the graph data GRAPH_DATA in the first memory device 221 and the second memory device 222. The graph processing device 223 may perform a graph computation on the graph data GRAPH_DATA distributedly stored in the first memory device 221 and the second memory device 222, and may output a result of the graph computation to the host 21.

While not directly illustrated in the drawings, the graph processing device 223 may include various hardware components including streaming multiprocessors, streaming processors and warps as thread groups. From a software point of view, such hardware may be integrated with, or operably coupled to, grids, blocks and threads.

Among parallel computation models, a bulk synchronous parallel (BSP) model is actively studied for graph processing. Pregel as a graph-specific platform (Reference 4: Grzegorz Malewicz, Matthew H. Austern, Aart J C Bik, James C. Dehnert, Ilan Horn, Naty Leiser, and Grzegorz Czajkowski, "Pregel: A System for Large-Scale Graph Processing" in SIGMOD, 2010), established to replace Hadoop, is a representative BSP example, and may be used mainly for a vertex-centric graph computation.

As a representative method for expressing data when the graph data GRAPH_DATA is loaded to a memory for a graph computation, there is a compressed sparse row (CSR) (Reference 5: Samuel Williams, Leonied Oilker, Richard Vuduc, John Shalf, Katherine Yelick, and James Demmel, "Optimization of Sparse Matrix-Vector Multiplication on Emerging Multicore Platforms" in SC, 2007). The CSR may be efficient in terms of capacity of the memory which loads the graph data GRAPH_DATA. However, an operation of sequentially accessing neighboring vertex indexes of a plurality of respective vertices included in the graph data GRAPH_DATA in the process of performing a graph computation, that is, accessing vertex values through indexes, may cause frequent random reads and random writes with respect to the memory which stores the graph data GRAPH_DATA.

Therefore, a shard, as a data representation scheme, capable of improving the I/O performance of the memory in which the graph data GRAPH_DATA is stored, by listing the information in the graph data GRAPH_DATA such that a specific number of sequential vertices are defined as terminal vertices as illustrated in FIG. 3, has been suggested (Reference 6: A. Kyrola, G. E. Blelloch, and C. Guestrin, "GraphChi: Large-Scale Graph Computation on Just a PC" in USENIX, 2012).

According to a G-shard, obtained by correcting the shard to be appropriate for the processing of the graph data GRAPH_DATA, such graph data may be divided into plural rows R1, R2, R3, R4, R5, R6 and R7 each having the following fields: a start vertex index S_INDEX, a start vertex value S_VALUE, a terminal vertex index T_INDEX and an edge value ST_EDGE between the start vertex and the terminal vertex. A plurality of threads in the graph processing device 223 receives, in parallel, the plurality of rows R1, R2, R3, R4, R5, R6 and R7 and sequentially processes the plurality of rows R1, R2, R3, R4, R5, R6 and R7.

FIG. 3 illustrates that four terminal vertex indexes T_INDEX (having values 0 to 3) are designated as the size of the shard.

Referring to FIG. 4, in the conventional BSP model, when the total number of vertices M in the graph data are divisionally allocated to N blocks BLOCK<0, 1, . . . , N> for parallel computations, a value of M/N vertices (M/N VERTEXES) may be allocated to each of the N blocks BLOCK<0, 1, . . . , N> as the start vertex value S_VALUE. In this way, by performing a graph computation through a vertex computation on the value of the M/N vertices (M/N VERTEXES) allocated to each of the N blocks BLOCK<0, 1, . . . , N>, a terminal vertex value corresponding to each of the N blocks BLOCK<0, 1, . . . , N> may be determined. In the graph computation for each of the N blocks BLOCK<0, 1, . . . , N>, the edge value ST_EDGE between a start vertex and a terminal vertex and the terminal vertex index T_INDEX in the graph data GRAPH_DATA may be referred to. Also, since an edge may exist between vertices in different blocks in the process of performing the graph computation on each of the N blocks BLOCK<0, 1, . . . , N>, message passing MESSAGE PASSING may be used for data sharing. For reference, the M/N vertices (M/N VERTEXES) allocated to one block may be the size of the shard.

In this way, performing one graph computation on the entirety of the M vertices in the graph data GRAPH_DATA by performing graph computations on the N respective blocks BLOCK<0, 1, . . . , N>, that is, N graph computations, may be defined as a super step SUPER STEP. If M terminal vertex values are determined as one super step SUPER STEP, which is completed on the M start vertex values, the determined M terminal vertex values may be set as M start vertex values S_VALUE, and then, a new super step SUPER STEP may be started. Such a super step may be iterated until graph computation is saturated. Here, saturation of graph computation means that the difference between a start vertex value and a terminal vertex value is within a preset range. That is, if M terminal vertex values determined by performing graph computations on the M start vertex values result in differences within the preset range from the M start vertex values of the graph computations, it may be meaningless to perform an additional graph computation, as it may not further reduce the difference between a start vertex value and a terminal vertex value. Therefore, a case where a start vertex value and a terminal vertex value have a difference within the preset range may be referred to as a state in which a graph computation is saturated.

While an operation of checkpointing CHECK POINT a graph computation result after the super step is iterated twice is illustrated (see SUPER STEP<0> and SUPER STEP<1> in FIG. 4), this is merely an example. In practice, the super step may be iterated any suitable number of times, after which, a graph computation result may be checkpointed. For example, a graph computation result may be checkpointed at a cycle of 5 to 10 iterations of the super step. For reference, checkpointing CHECK POINT a graph computation result may mean a method of dumping all graph data determined up to the time at which the checkpointing is performed, to a nonvolatile storage device, and thereby permanently storing all the graph data. In this way, by checkpointing a graph computation result periodically, the next graph computation cannot be performed normally due to an unexpected error, graph data may be recovered through the graph computation result stored in the immediately previous checkpointing, and thereby, a normal graph computation may be performed again. In other words, failure recovery of the graph data may be performed through checkpointing.

Referring back to FIG. 2, in order for a huge number of threads in the graph processing device 223 to perform efficient graph computations on the graph data GRAPH_DATA, a memory device which has a relatively large capacity and a high operation speed is needed. However, it is not easy to increase storage capacity of a high speed memory device, and, even if the storage capacity may be increased, doing so may be prohibitively expensive.

Thus, the graph processing system 22 in accordance with an embodiment of the disclosure may include the two memory devices 221 and 222 which have different characteristics. Namely, the graph processing system 22 may include the first memory device 221 which has a relatively large capacity and the second memory device 222 which has a relatively high operation speed compared to the first memory device 221.

The first memory device 221 may be a nonvolatile memory device which inputs/outputs data in the unit of a page. For example, the first memory device 221 may be any of a flash memory, a phase change random access memory (PCRAM), a resistive random access memory (RRAM), a ferroelectric random access memory (FRAM) and/or a spin transfer torque magnetic random access memory (STT-MRAM).

The second memory device 222 may be a volatile memory device which inputs/outputs data in the unit of a bit. For example, the second memory device 222 may be any of a static random access memory (SRAM) and/or a dynamic random access memory (DRAM).

The graph data GRAPH_DATA transferred from the host 21 to the graph processing system 22 may include the start vertex index S_INDEX, the start vertex value S_VALUE, the edge value ST_EDGE between a start vertex and a terminal vertex, and the terminal vertex index T_INDEX.

In detail, in the graph data GRAPH_DATA, the start vertex index S_INDEX, the edge value ST_EDGE between a start vertex and a terminal vertex and the terminal vertex index T_INDEX may be read-only data, which is not changed or updated in the process of performing a graph computation. On the other hand, in the graph data GRAPH_DATA, the start vertex value S_VALUE may be read in the process of performing a graph computation but is written each time a super step SUPER STEP of a graph computation is iterated. That is to say, the start vertex value S_VALUE in the graph data GRAPH_DATA may be read and/or written.

In addition, in the graph data GRAPH_DATA, the size of data obtained by summing the start vertex index S_INDEX, the edge value ST_EDGE and the terminal vertex index T_INDEX may be much larger than the data size of the start vertex value S_VALUE. For example, assuming that 4.8M vertices and 69M edges are included in the graph data GRAPH_DATA, the size of data obtained by summing the start vertex index S_INDEX, the edge value ST_EDGE and the terminal vertex index T_INDEX may be about 1.1 GBytes, but the data size of the start vertex value S_VALUE may be 19.2 MBytes (Reference 7: J. Leskovec, K. J. Lang, A. Dasgupta, and M. W. Mahoney, "Community Structure in Large Networks: Natural Cluster Sizes and the Absence of Large Well-Defined Clusters" in Internet Mathematics, 2009).

For reference, it is common for all currently existing memory devices that a read speed is faster than a write speed, and the same applies to the first memory device 221 and the second memory device 222. For example, assuming that the first memory device 221 is a phase change memory (PCRAM), a read speed may be 185 ns, but a write speed may be 20 us. Also, assuming that the second memory device 222 is a dynamic RAM (DRAM), a read speed may be 100 ns, but a write speed may be 125 ns.

Therefore, in the graph processing system 22 in accordance with an embodiment of the disclosure, the start vertex index S_INDEX, the edge value ST_EDGE between a start vertex and a terminal vertex and the terminal vertex index T_INDEX of the graph data GRAPH_DATA may be stored as read-only data in the first memory device 221 which has a relatively large capacity but has a relatively low operation speed. The start vertex value S_VALUE of the graph data GRAPH_DATA may be stored as read-and-write data in the second memory device 222 which has a relatively small capacity but has a relatively high operation speed.

Referring to FIG. 3, a single piece of the graph data GRAPH_DATA may correspond to a single row Rx. Therefore, assuming that two graph data GRAPH_DATA are inputted from the host 21, '0, V0, 5 and 1', which are respectively the start vertex index S_INDEX, the start vertex value S_VALUE, the edge value ST_EDGE and the terminal vertex index T_INDEX corresponding to a first row R1, may be provided, and then, '1, V1, 1 and 2', which are respectively the start vertex index S_INDEX, the start vertex value S_VALUE, the edge value ST_EDGE and the terminal vertex index T_INDEX corresponding to a second row R2, may be provided. In this way, in the case where the remainder of S_INDEX, ST_EDGE and T_INDEX, that is, excluding the start vertex value S_VALUE, in the graph data GRAPH_DATA are stored, on the row-by-row basis, in the first memory device 221 which inputs/outputs data in the unit of a page, access to the first memory device 221 may occur too frequently.

In accordance with an embodiment of the disclosure, the graph processing system 22 may group a plurality of start vertex indexes S_INDEX, which are respectively included in a plurality of graph data GRAPH_DATA, into at least one page, and then, may store such page(s) in the first memory device 221. Further, the graph processing system 22 may group a plurality of terminal vertex indexes T_INDEX, which are respectively included in the plurality of graph data GRAPH_DATA, into at least one page, and may store page(s) in the first memory device 221. Moreover, the graph processing system 22 may group a plurality of edge values ST_EDGE, which are respectively included in the plurality of graph data GRAPH_DATA, into at least one page, and then, may store such page(s) in the first memory device 221.

In summary, when a single piece of graph data GRAPH_DATA corresponds to one row Rx as described above with reference to FIG. 3, the graph processing system 22 may group plural pieces or plural rows of the graph data GRAPH_DATA on a column basis or a field basis and then store the grouped data in the first memory device 221. Referring to FIG. 3, in the plural rows R1, R2, R3, R4, R5, R6 and R7 of the graph data GRAPH_DATA, '0, 1, 5, 5, 6, 7 and 7', being the values of the start vertex index S_INDEX, may be grouped to have a size of at least one page; '5, 1, 6, 4, 4, 3 and 9', being the values of the edge value ST_EDGE, may be grouped to have a size of at least one page; and '1, 2, 1, 3, 0, 0 and 2', being the values of the terminal vertex index T_INDEX, may be grouped to have a size of at least one page. The respectively grouped data of the start vertex index S_INDEX, the edge value ST_EDGE and the terminal vertex index T_INDEX may be stored in the first memory device 221.

On the other hand, each time a single piece or a single row of the graph data GRAPH_DATA is inputted from the host 21, the graph processing system 22 may store, in the second memory device 222, the start vertex value S_VALUE in the inputted piece or row of the graph data GRAPH_DATA.

In accordance with an embodiment of the disclosure, the graph processing system 22 may process the graph data GRAPH_DATA distributed in the first memory device 221 and the second memory device 222 according to the BSP model, which is described below with reference to FIG. 5.

Referring to FIGS. 2, 4 and 5, the graph processing system 22 in accordance with an embodiment of the disclosure may perform a rearrangement operation (A) of rearranging start vertex values S_VALUE as intermediate vertex values M_VALUE in the second memory device 222, by referring to the start vertex indexes S_INDEX of the first memory device 221.

In detail, the graph processing device 223 may read at least one page in which start vertex indexes S_INDEX are stored, in the first memory device 221, and then, may perform the rearrangement operation (A) of rearranging the start vertex values S_VALUE stored in the second memory device 222 as the intermediate vertex values M_VALUE, by referring to the read start vertex indexes S_INDEX.

The second memory device 222 may include a storage area 2221 and a processing area 2222. M start vertex values S_VALUE may be stored in the storage area 2221 of the second memory device 222. In addition, in the graph processing device 223, graph computations may be performed by dividing the M start vertex values S_VALUE by N blocks BLOCK<0, 1, . . . , N>, that is, grouping respective M/N start vertex values S_VALUE. Therefore, the graph processing device 223 may perform the rearrangement operation (A) of rearranging the M/N start vertex values S_VALUE as M/N intermediate vertex values M_VALUE, by referring to the start vertex indexes S_INDEX read from the first memory device 221. For reference, the rearrangement operation (A) may be performed by the graph processing device 223 as illustrated in the drawing, but may also be performed through separate hardware logic.

According to an embodiment, the M/N start vertex values S_VALUE may be moved from the storage area 2221 to the processing area 2222 of the second memory device 222, and then, may be rearranged as the M/N intermediate vertex values M_VALUE, by referring to the start vertex indexes S_INDEX of the first memory device 221. According to another embodiment, the M/N start vertex values S_VALUE may be rearranged as the M/N intermediate vertex values M_VALUE, in the storage area 2221 of the second memory device 222, by referring to the start vertex indexes S_INDEX of the first memory device 221, and then, only the M/N intermediate vertex values M_VALUE may be moved from the storage area 2221 to the processing area 2222 of the second memory device 222.

In succession, the graph processing system 22 may perform a computation operation (B) of performing graph computations on the intermediate vertex values M_VALUE of the second memory device 222, by referring to the terminal vertex indexes T_INDEX and the edge values ST_EDGE of the first memory device 221, and storing terminal vertex values T_VALUE determined as results of performing the graph computations, in the second memory device 222.

In detail, the graph processing device 223 may read at least one page in which terminal vertex indexes T_INDEX are stored, in the first memory device 221, may read at least one page in which edge values ST_EDGE are stored, in the first memory device 221, and then, may perform graph computations on the M/N intermediate vertex values M_VALUE stored in the processing area 2222 of the second memory device 222, by referring to the read terminal vertex indexes T_INDEX and edge values ST_EDGE. The graph processing device 223 may perform graph computations on the M/N intermediate vertex values M_VALUE, and then, may determine M/N terminal vertex values T_VALUE as computation results. After determining the M/N terminal vertex values T_VALUE through the graph computations, the graph processing device 223 may store the determined M/N terminal vertex values T_VALUE in the storage area 2221 of the second memory device 222.

Because message passing MESSAGE PASSING is used for data sharing, the graph processing device 223 may generate messages in the process of determining the terminal vertex values T_VALUE by performing the graph computations on the intermediate vertex values M_VALUE. The graph processing device 223 may store the messages generated in this way, in the second memory device 222 in correspondence to the terminal vertex values T_VALUE. Namely, the graph processing device 223 may generate a plurality of messages corresponding to the M/N terminal vertex values T_VALUE, respectively, in the process of the determining the M/N terminal vertex values T_VALUE by performing the graph computations on the M/N intermediate vertex values M_VALUE. The graph processing device 223 may store the messages in the storage area 2221 of the second memory device 222 to correspond to M/N terminal vertex values T_VALUE, respectively.

As described above, after performing the rearrangement operation (A) of rearranging the M/N start vertex values S_VALUE as the M/N intermediate vertex values M_VALUE, the graph processing system 22 may determine the M/N terminal vertex values T_VALUE by performing the graph computations on the M/N intermediate vertex values M_VALUE through the computation operation (B). By performing such graph computations N times, after the M start vertex values S_VALUE are rearranged as the M intermediate vertex values M_VALUE, M terminal vertex values T_VALUE may be determined by performing graph computations on the M intermediate vertex values M_VALUE. As such, a state in which one graph computation is performed on the M start vertex values S_VALUE, and thereby the M terminal vertex values T_VALUE are determined, may be referred to as a state in which one super step SUPER STEP is completed.

After a first iteration of the super step SUPER STEP is completed, the graph processing system 22 may perform a determination operation (C) of determining whether a graph processing operation is completed, by comparing the start vertex values S_VALUE and the terminal vertex values T_VALUE.

In detail, in the case where the differences between the M start vertex values S_VALUE and the M terminal vertex values T_VALUE are within a preset range, the graph processing device 223 may determine that the graph processing operation is completed. On the other hand, in the case where the differences between the M start vertex values S_VALUE and the M terminal vertex values T_VALUE are outside the preset range, the graph processing device 223 may determine that the graph processing operation is not completed.

In the case where it is determined in the determination operation (C) that the graph processing operation is not completed, the graph processing device 223 may perform a setting operation (D) of setting the terminal vertex values T_VALUE as new start vertex values S_VALUE in the second memory device 222. The start vertex values S_VALUE already stored in the second memory device 222 before the terminal vertex values T_VALUE are set as the new start vertex values S_VALUE in this way may be set as previously used vertex values and be continuously stored in the second memory device 222, according to an exemplary embodiment. According to another embodiment, after deleting the start vertex values S_VALUE stored in the second memory device 222 before performing the setting operation (D), new start vertex values S_VALUE may be generated by performing the setting operation (D).

In detail, in the case where it is determined in the determination operation (C) that the graph processing operation is not completed, the graph processing device 223 may set the M terminal vertex values T_VALUE as M new start vertex values S_VALUE in the second memory device 222 through the setting operation (D). Therefore, after the setting operation (D) is performed, M terminal vertex values T_VALUE may not exist anymore in the second memory device 222.

In the case where it is determined in the determination operation (C) that the graph processing operation is not completed, the graph processing device 223 may perform another iteration of the super step SUPER STEP following the first or previous iteration. That is to say, after the rearrangement operation (A), the computation operation (B) and the determination operation (C) are performed through the previously performed super step SUPER STEP, in the case where it is determined in the determination operation (C) that the graph processing operation is not completed, the graph processing device 223 may perform another iteration of the super step SUPER STEP including the setting operation (D), the rearrangement operation (A), the computation operation (B) and the determination operation (C).

In this way, the super step SUPER STEP may be iterated multiple times. Since the start vertex values S_VALUE inputted from the host 21 are directly allocated only in the first iteration of the super step SUPER STEP, the setting operation (D) may not be included in the first iteration. From a second iteration of the super step SUPER STEP to a last iteration, the setting operation (D) of setting terminal vertex values T_VALUE determined in a previous iteration as start vertex values S_VALUE may be included in the next iteration.

Meanwhile, in order for failure recovery of the graph data GRAPH_DATA, it may be necessary to perform an operation of checkpointing CHECK POINT a graph computation result each time a super step SUPER STEP is iterated a set number of times.

To this end, the graph processing system 22 in accordance with an embodiment of the disclosure may count the number of times the determination operation (C) included in each of the iterations of the super step SUPER STEP is performed. In other words, the graph processing device 223 may perform a counting operation of increasing a counting value by one each time one super step SUPER STEP is performed.

In addition, as a result of performing the determination operation (C) in any one super step iteration, in the case where it is determined that the graph processing operation is not completed, that iteration including the corresponding determination operation (C) may not be the last iteration. Therefore, in the case of an intermediate iteration, other than the last iteration, that is, in the case where the graph processing operation is not completed as a result of the determination operation (C), the graph processing system 22 may check the value of the counting operation, and depending on the checked counting value, may perform a checkpoint CHECK POINT operation of storing the terminal vertex values T_VALUE stored in the second memory device 222, in the first memory device 221, as an intermediate result of the graph processing operation (F). For example, in the case where the graph processing operation is not completed as a result of the determination operation (C), the graph processing device 223 may check the value of the counting operation, and, in the case where the checked counting value is a multiple of 5 (5, 10, 15, 20, . . . ), may perform an intermediate storage operation (F) of storing the terminal vertex values T_VALUE stored in the second memory device 222, in the first memory device 221, as an intermediate result of the graph processing operation. In the case where the checked counting value is not a multiple of 5, the intermediate storage operation (F) may not be performed, and performing of a next super step SUPER STEP may be started, that is, the setting operation (D), the rearrangement operation (A), the computation operation (B) and the determination operation (C) may be performed.

In this regard, the graph processing system 22 may control a period in which the intermediate storage operation (F) of a preceding iteration among the multiple iterations of the super step SUPER STEP is performed, to overlap with a period in which the setting operation (D), the rearrangement operation (A), the computation operation (B) and the determination operation (C) of a following iteration are performed. For example, a period in which the intermediate storage operation (F) of a fifth iteration is performed may overlap with a period in which the setting operation (D), the rearrangement operation (A), the computation operation (B) and the determination operation (C) of a sixth iteration are performed.

In the determination operation (C) included in the last iteration, it may be determined that the graph computation is completed. In this manner, in the case where it is determined in the determination operation (C) that the graph computation is completed, the graph processing device 223 may perform a final storage operation (G) of storing the terminal vertex values T_VALUE stored in the second memory device 222, in the first memory device 221, as a final result of the graph processing operation.

The graph processing system 22 may perform the intermediate storage operation (F) at least twice in the process of performing the multiple iterations of the super step SUPER STEP. In this case, the graph processing system 22 may set a storage area of the first memory device 221 used in a preceding intermediate storage operation (F) of at least two intermediate storage operations (F) and a storage area of the first memory device 221 used in a following intermediate storage operation (F), to be different from each other. To this end, the graph processing system 22 may release the storage area of the first memory device 221 which is used in the preceding intermediate storage operation (F), at a time when the following intermediate storage operation (F) is completed (H). For example, the graph processing device 223 may use a first storage area of the first memory device 221 when performing a first intermediate storage operation (F). Thereafter, when performing a second intermediate storage operation (F) following the first intermediate storage operation (F), the graph processing device 223 may use a second storage area of the first memory device 221 which is different from the first storage area. In this case, at a time when the operation of storing the terminal vertex values T_VALUE corresponding to the second intermediate storage operation (F) in the second storage area of the first memory device 221 is completed, the graph processing device 223 may release the first storage area of the first memory device 221 in which the terminal vertex values T_VALUE corresponding to the first intermediate storage operation (F) are stored.

The graph processing system 22 may perform the final storage operation (G) after performing at least one intermediate storage operation (F) in the process of performing the multiple iterations of the super step SUPER STEP. In this case, the graph processing system 22 may set a storage area of the first memory device 221 used in the intermediate storage operation (F) and a storage area of the first memory device 221 used in the final storage operation (G), to be different from each other. To this end, the graph processing system 22 may release the storage area of the first memory device 221 which is used in the intermediate storage operation (F), at a time when the final storage operation (G) is completed (H). For example, the graph processing device 223 may use a third storage area of the first memory device 221 when performing the intermediate storage operation (F). Thereafter, the graph processing device 223 may use a fourth storage area of the first memory device 221 which is different from the third storage area, when performing the final storage operation (G). In this case, at a time when the operation of storing the terminal vertex values T_VALUE corresponding to the final storage operation (G) in the fourth storage area of the first memory device 221 is completed, the graph processing device 223 may release the third storage area of the first memory device 221 in which the terminal vertex values T_VALUE corresponding to the intermediate storage operation (F) are stored.

Although various embodiments have been illustrated and described, it will be apparent to those skilled in the art in light of the present disclosure that various changes and modifications may be made without departing from the spirit and scope of the invention as defined in the following claims.

What is claimed is:

1. A method for operating a graph processing system including a first memory device and a second memory device, comprising:
   storing, as a first storage operation, in the first memory device, a start vertex index, a terminal vertex index and an edge value between a start vertex and a terminal vertex of graph data inputted from a host;
   storing, as a second storage operation, in the second memory device, a start vertex value of the graph data;
   rearranging the start vertex value as an intermediate vertex value by using to the start vertex index;

performing a graph computation on the intermediate vertex value by using to the terminal vertex index and the edge value;

storing, as a third storage operation, in the second memory device, a terminal vertex value as a result of the graph computation;

determining whether a graph processing operation is completed by comparing the terminal vertex value and the start vertex value;

setting the terminal vertex value as the start vertex value when the graph processing operation is determined as not completed; and iterating the rearranging, the performing, the third storage operation, the determining and the setting until it is determined that the graph processing operation is completed.

2. The method according to claim 1, further comprising: storing, as a fourth storage operation, the terminal vertex value in the first memory device, as the result of the graph processing operation, when it is determined that the graph processing operation is completed.

3. The method according to claim 2, further comprising: storing, as an intermediate storage operation, when it is determined that the graph processing operation is not completed, and storing the terminal vertex value in the first memory device as an intermediate result of the graph processing operation, depending on a number of times the determining operation is performed.

4. The method according to claim 3, wherein a period in which the intermediate storage operation is performed overlaps with a period in which the setting, the rearranging, the performing, the third storage and the determining operations are performed through the iterating.

5. The method according to claim 3, wherein:
when the intermediate storage operation is performed at least twice, a storage area of the first memory device which is used in a preceding intermediate storage operation and a storage area of the first memory device which is used in a following intermediate storage operation are different from each other, and
the storage area which is used in the preceding intermediate storage operation is released when the following intermediate storage operation is completed.

6. The method according to claim 3, wherein:
a storage area of the first memory device which is used in the intermediate storage operation and a storage area of the first memory device which is used in the fourth storage operation are different from each other, and
the storage area which is used in the intermediate storage operation is released when the fourth storage operation is completed.

7. The method according to claim 1,
wherein the performing of the graph computation includes generating a message,
the method further comprising: storing, as a fifth storage operation, in the second memory device, the message to correspond to the terminal vertex value.

8. The method according to claim 1, wherein:
the first memory device is a nonvolatile memory device which inputs/outputs data in the unit of a page, and
the second memory device is a volatile memory device which inputs/outputs data in the unit of a bit.

9. The method according to claim 8,
wherein the graph data includes a plurality of pieces of data that include a plurality of start vertex indexes, a plurality of terminal vertex indexes, a plurality of edge values and a plurality of start vertex values, respectively, wherein the first storage operation comprises:
grouping the plurality of start vertex indexes, the plurality of terminal vertex indexes, and the plurality of edge values in units of pages; and
storing, as sixth storage operation, the pages in the first memory device, and wherein the second storage operation comprises storing the start vertex values in the second memory device.

10. A graph processing system comprising:
a first memory device;
a second memory device; and
a graph processing device configured to:
store, as a first storage operation, in the first memory device, a start vertex index, a terminal vertex index and an edge value between a start vertex and a terminal vertex of graph data inputted from a host;
store, as a second storage operation, in the second memory device, a start vertex value in the graph data;
rearrange the start vertex value as an intermediate vertex value based on the start vertex index;
perform a graph computation on the intermediate vertex value based on the terminal vertex index and the edge value;
store, as a third storage operation, in the second memory device, a terminal vertex value as a result of the graph computation;
determine whether a graph processing operation is completed by comparing the terminal vertex value and the start vertex value;
set the terminal vertex value as the start vertex value when it is determined that the graph processing operation is not completed; and
iterate the rearrange, perform, third storage, determine and set operations until it is determined that the graph processing operation is completed.

11. The graph processing system according to claim 10, wherein the graph processing device is further configured to:
store, as an intermediate storage operation, when it is determined that the graph processing operation is not completed, the terminal vertex value in the first memory device as an intermediate result of the graph processing operation, depending on a number of times the determination act is performed; and
store, as a fourth storage operation, the terminal vertex value in the first memory device, as the result of the graph processing operation, when it is determined that the graph processing operation is completed.

12. The graph processing system according to claim 11, wherein the graph processing device is further configured to control a period in which the intermediate storage operation is performed, to overlap with a period in which the set, rearrange, perform, third storage and determine operations are performed through the iterate operation.

13. The graph processing system according to claim 11, wherein the graph processing device is further configured to:
set, when the intermediate storage operation is performed at least twice, a storage area used in the first memory device in a preceding intermediate storage operation and a storage area used in the first memory device in a following intermediate storage operation to be different from each other, and
release the storage area used in the preceding intermediate storage operation when the following intermediate storage operation is completed.

14. The graph processing system according to claim 11, wherein the graph processing device is further configured to:
set a storage area used in the first memory device in the intermediate storage operation and a storage area used in the first memory device in the fourth storage operation to be different from each other, and
release the storage area used in the intermediate storage operation when the fourth storage operation is completed.

15. The graph processing system according to claim 10, wherein the perform the graph computation operation includes generating a message, and
wherein the graph processing device is further configured to store, as a fifth storage operation, in the second memory device, the message to correspond to the terminal vertex value.

16. The graph processing system according to claim 10, wherein
the first memory device is a nonvolatile memory device which inputs/outputs data in the unit of a page, and
the second memory device is a volatile memory device which inputs/outputs data in the unit of a bit.

17. The graph processing system according to claim 16, wherein the graph data includes a plurality of pieces of data that include a plurality of start vertex indexes, a plurality of terminal vertex indexes, a plurality of edge values and a plurality of start vertex values, respectively,
wherein the first storage operation comprises:
grouping the plurality of start vertex indexes, the plurality of terminal vertex indexes, the plurality of edge values in units of pages; and
storing, as a sixth storage operation, the pages in the first memory device, and
wherein the second storage operation comprises storing the start vertex values in the second memory device.

18. A graph processing system comprising:
a first memory device configured to store a read-only portion of graph data inputted from a host;
a second memory device configured to store a read-and-write portion of the graph data; and
a graph processor configured to:
perform a super step operation iteratively based on the graph data distributed in the first and second memory devices; and
perform, each time after a set number of the iterations are performed, a checkpointing operation of storing a result of a last of the set number of the iterations,
wherein the first memory device has a greater storage capacity than the second memory device, and
wherein the second memory device has a higher operation speed than the first memory device.

19. The graph processing system of claim 18,
wherein the read-only portion includes a start vertex index, a terminal vertex index and an edge value between a start vertex and a terminal vertex in each piece of the graph data, and
wherein the read-and-write portion includes a start vertex value of a row.

20. The graph processing system of claim 19,
wherein the first memory device respectively stores, on a group basis, the start vertex indexes, the terminal vertex indexes and the edge values in plural pieces of the graph data, and
wherein each of the groups has a size corresponding to a storage element of the first memory device.

* * * * *